United States Patent
Sugiura

(10) Patent No.: US 11,640,779 B2
(45) Date of Patent: May 2, 2023

(54) IMAGE OUTPUT DEVICE, IMAGE DISPLAY DEVICE, IMAGE DISPLAY SYSTEM, AND PAIRING METHOD THEREFOR

(71) Applicant: Panasonic Intellectual Property Management Co., Ltd., Osaka (JP)

(72) Inventor: Yoshinao Sugiura, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 53 days.

(21) Appl. No.: 17/306,222

(22) Filed: May 3, 2021

(65) Prior Publication Data

US 2021/0358372 A1  Nov. 18, 2021

(30) Foreign Application Priority Data

May 12, 2020 (JP) .............................. JP2020-083920
Apr. 8, 2021 (JP) .............................. JP2021-065565

(51) Int. Cl.
*G09G 3/20* (2006.01)

(52) U.S. Cl.
CPC .......... *G09G 3/20* (2013.01); *G09G 2370/02* (2013.01); *G09G 2370/06* (2013.01); *G09G 2370/16* (2013.01)

(58) Field of Classification Search
CPC .. G09G 2370/16; G09G 2370/02; G09G 3/20; G09G 2370/06
See application file for complete search history.

(56) References Cited

U.S. PATENT DOCUMENTS

| | | | |
|---|---|---|---|
| 9,948,972 B2* | 4/2018 | Moon ................ | H04N 21/4788 |
| 2003/0158886 A1* | 8/2003 | Walls .................... | G06T 15/005 |
| | | | 709/201 |
| 2009/0178086 A1 | 7/2009 | Unger | |
| 2014/0281547 A1 | 9/2014 | Modzelewski et al. | |
| 2015/0254045 A1* | 9/2015 | Drake ................ | G06Q 30/0267 |
| | | | 345/1.3 |
| 2015/0326915 A1* | 11/2015 | Jaynes ................. | H04N 21/436 |
| | | | 725/109 |
| 2016/0065878 A1 | 3/2016 | Nagumo et al. | |
| 2019/0058913 A1* | 2/2019 | Park ........................ | G06F 3/038 |

FOREIGN PATENT DOCUMENTS

| | | |
|---|---|---|
| JP | 2006-261807 | 9/2006 |
| JP | 2011-514693 | 5/2011 |
| JP | 2016-51943 | 4/2016 |
| JP | 2016-519458 | 6/2016 |
| JP | 2019-74909 | 5/2019 |
| WO | 2009/085482 | 7/2009 |
| WO | 2014/165172 | 10/2014 |

* cited by examiner

*Primary Examiner* — Abbas I Abdulselam
(74) *Attorney, Agent, or Firm* — Wenderoth, Lind & Ponack, L.L.P.

(57) ABSTRACT

An image display system according to the present disclosure includes a plurality of image output devices and a plurality of image display devices that are connected to one another via a network. When a predetermined image output device that is one of the plurality of image output devices and a predetermined image display device that is one of the plurality of image display devices are connected, the predetermined image output device transmits a pairing start image signal to the predetermined image display device. The predetermined image display device receives the pairing start image signal transmitted from the predetermined image output device.

11 Claims, 9 Drawing Sheets

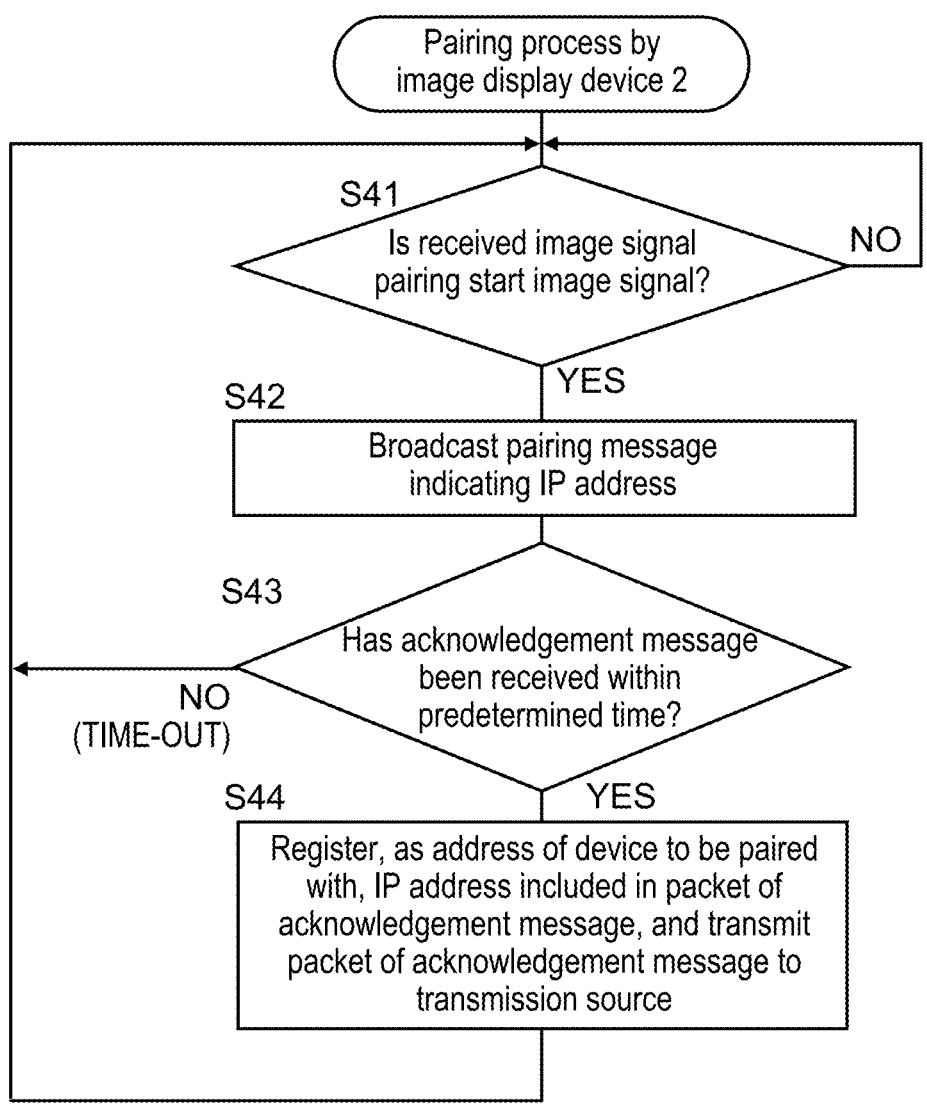

IMAGE OUTPUT DEVICE, IMAGE DISPLAY DEVICE, IMAGE DISPLAY SYSTEM, AND PAIRING METHOD THEREFOR

BACKGROUND

1. Technical Field

The present disclosure relates to image output devices, image display devices, image display systems, and pairing methods therefor.

2. Description of the Related Art

A conventional technique requires pairing in a network in order to perform communication between a master unit that is an image output device and a slave unit that is an image display device; for example, Patent Literature (PTL) 1 (hereinafter referred to as a conventional example) discloses a pairing method that can improve the signaling speed of said communication.

Specifically, the conventional example discloses a communication system including:
(A) a master unit that has an infrared receiving function and a network communication function and is exemplified by a karaoke machine; and
(B) a slave unit that has an infrared communication function and a network communication function, is identified by ID, and is exemplified by a remote controller such as an operation wireless terminal device.

Here, a pairing method for use in the communication system includes:
(1) the step of transmitting ID of a slave unit in the form of infrared signals from the slave unit to a specific master unit;
(2) the step of receiving, by the master unit, the infrared signals including the ID of the slave unit;
(3) the step of broadcasting, onto a network, a confirmation message including the ID of the slave unit received by the master unit;
(4) the step of, when the slave unit receives the confirmation message including the own ID of the slave unit from the master unit, registering the master unit as a master unit acting as a communication partner, and transmitting a confirmation message directed to the master unit; and
(5) the step of, when the master unit receives the confirmation message directed to the master unit itself from the slave unit, registering the slave unit as a slave unit acting as a communication partner.

PTL 1 is Unexamined Japanese Patent Publication No. 2006-261807.

SUMMARY

However, in the invention according to the conventional example, which discloses a method for pairing a master unit that is a karaoke device and a slave unit that is a remote controller, another communication means, for example, means of infrared communication or the like, is required to report the ID of the slave unit. Furthermore, since the pairing is triggered by a user instruction via the remote controller, it is problematic that the master unit and the slave unit are not automatically linked to each other.

Moreover, in order to link an image output device serving as a master unit and an image display device serving as a slave unit on a network, for example, network addresses need to be explicitly designated, resulting in a problem of non-automatic linking of the master unit and the slave unit as in the conventional example.

An object of the present disclosure is to provide an image display system capable of solving the above problems and automatically linking an image output device serving as a master unit and an image display device serving as a slave unit to each other on a network, a pairing method therefor, and the image output device and the image display device for use in the image display system.

The image display system according to the present disclosure includes a plurality of image output devices and a plurality of image display devices that are connected to one another via a network. When a predetermined image output device that is one of the plurality of image output devices and a predetermined image display device that is one of the plurality of image display devices are connected, the predetermined image output device transmits a pairing start image signal to the predetermined image display device. The predetermined image display device receives the pairing start image signal transmitted from the predetermined image output device.

Thus, according to the present disclosure, when the predetermined image output device and the predetermined image display device are connected, the predetermined image output device transmits the pairing start image signal to the predetermined image display device. This allows the image output device serving as a master unit and the image display device serving as a slave unit to be automatically linked to each other on the network as triggered by the pairing start image signal.

BRIEF DESCRIPTION OF DRAWINGS

FIG. 11 is a flowchart illustrating a pairing process performed by image display device 2 illustrated in FIG. 1.

DETAILED DESCRIPTION

Hereinafter, an exemplary embodiment will be described in detail with reference to the drawings as necessary. However, there are instances where overly detailed description is omitted. For example, detailed description of well-known matter, overlapping description of substantially identical elements, etc., may be omitted. This is to prevent the subsequent description from becoming unnecessarily redundant, and thus facilitate understanding by a person having ordinary skill in the art.

Note that the accompanying drawings and the subsequent description are provided in order for a person having ordinary skill in the art to sufficiently understand the present disclosure, and are not intended to limit the scope of the subject matter recited in the Claims.

Underlying Knowledge of Inventors

In the following cases, mutual reading of predetermined information and setting changes are needed for an image display device such as a projector to which an image output device such as an image play device is connected, and it is necessary to construct, by pairing the image output device and the image display device, an environment where the image output device and the image display device can perform one-to-one communication with each other.

(Case A) The image output device performs some of image processing functions included in the image display device; for example, in the case where the image output device is capable of geometric correction with higher functionality, the status of this function of the image display device needs to be checked, parameters of the image display device for this function need to be read, and the settings of the image display device for this function need to be changed (turned OFF).

(Case B) It can be expected that the image quality will improve with the use of an image processing function included in the image display device instead of an image processing function set in the image output device; for example, if the image quality decreases due to a reduction in bit precision at the time of transmission to the image display device, the presence and absence of this function in the image display device needs to be checked, the status of this function of the image display device needs to be checked, and the settings of the image display device for this function needs to be changed.

In order to solve the problems in the cases A and B, the following exemplary embodiment is characterized in that the image output device and the image display device are paired with each other by automatically exchanging network addresses that are IP addresses, for example, on a network such as a local area network (LAN), and registering the network addresses.

Exemplary Embodiment

Figure 1:
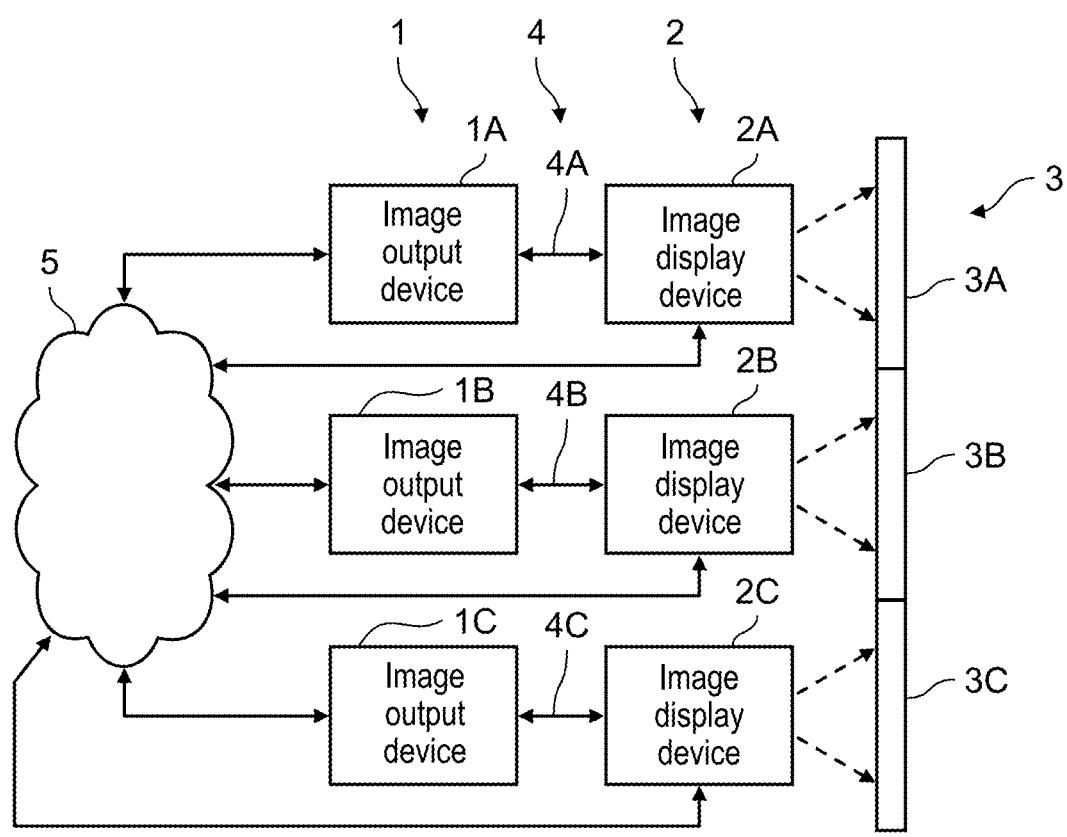
FIG. 1 is a block diagram illustrating an example of the configuration of an image display system according to an exemplary embodiment.

FIG. 1 is a block diagram illustrating an example of the configuration of an image display system according to an exemplary embodiment.

[Configuration of Image Display System]

In FIG. 1, the image display system includes a plurality of image output devices, for example, three image output devices 1A, 1B, 1C (hereinafter collectively referred to as image output device 1), a plurality of image display devices, for example, three image display devices 2A, 2B, 2C (hereinafter collectively referred to as image display device 2), and network 5 that is, for example, a local area network (LAN). Here, each image output device 1 is, for example, an image play device, and is connected to network 5. Each image display device 2 is, for example, a projector, and is connected to network 5.

A user connects an image output terminal of image output device 1A and an image input terminal of image display device 2A via image cable 4A such as a high-definition multimedia interface (HDMI) (registered trademark) cable. A user connects an image output terminal of image output device 1B and an image input terminal of image display device 2B via image cable 4B such as a HDMI cable. Furthermore, a user connects an image output terminal of image output device 1C and an image input terminal of image display device 2C via image cable 4C such as a HDMI cable. Note that image cables 4A, 4B, 4C are collectively referred to as image cable 4.

Screens 3A, 3B, 3C (collectively referred to as screen 3) are disposed at the respective positions of projection planes of image display devices 2A, 2B, 2C. After image output device 1 and image display device 2 are connected by a user via image cable 4, image output device 1 and image display device 2 are paired with each other via network 5 as described in detail later. Next, an image signal is transmitted from each image output device 1 to corresponding paired image display device 2 via image cable 4, and said image display device 2 converts the received image signal into projection image light. The projection image light from image display device 2 is projected on screen 3, and thus an image of the image signal becomes visible to a user.

[Configuration of Image Output Device]

Figure 2:
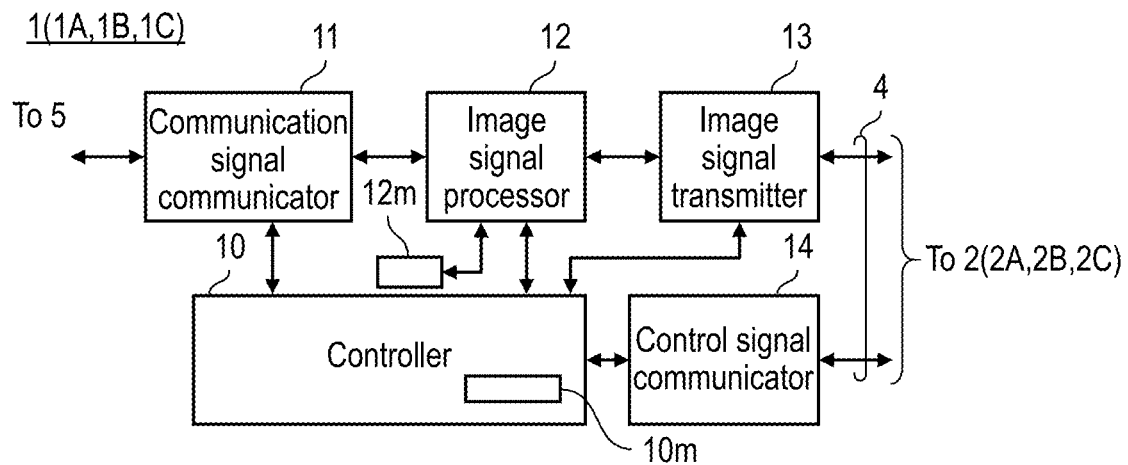
FIG. 2 is a block diagram illustrating an example of the configuration of image output devices 1A, 1B, 1C illustrated in FIG. 1.

FIG. 2 is a block diagram illustrating an example of the configuration of image output device 1 (1A, 1B, 1C) illustrated in FIG. 1. Note that image output devices 1A, 1B, 1C have substantially the same configurations.

In FIG. 2, image output device 1 includes controller 10 containing internal memory 10$m$, communication signal communicator 11, image signal processor 12 containing image signal memory 12$m$, image signal transmitter 13, and control signal communicator 14. Here, controller 10 controls the operation of communication signal communicator 11, image signal processor 12, image signal transmitter 13, and control signal communicator 14 on the basis of a program, signals, and data stored in internal memory 10$m$.

Communication signal communicator 11 transmits and receives communication signals to and from other image output devices 1 and image display device 2 via network 5 using, for example, a communication procedure according to the Transmission Control Protocol/Internet Protocol (TCP/IP). Communication signal communicator 11 transmits, via broadcast or unicast, a communication signal received from controller 10 such as a message to be transmitted, receives a communication signal such as a message via network 5, and outputs the communication signal to controller 10. Image signal processor 12 converts, under control of controller 10, data of image signals for image display stored in image signal memory 12$m$ into image data in a predetermined format and outputs the image data to image signal transmitter 13. Furthermore, under control of controller 10, image signal processor 12 converts data of pairing start image signals IS (which will be described in detail later) stored in image signal memory 12$m$ into image data in a predetermined format and outputs the image data to image signal transmitter 13.

Image signal transmitter 13 is connected to image signal receiver 21 of image display device 2 via image cable 4. Under control of controller 10, image signal transmitter 13 converts image data received from image signal processor 12 into HDMI-compliant technical data management streaming (TDMS) image data and clock signals, for example, and further generates HDMI-compliant +5V-Power signals and display data channel (DDC): high-bandwidth digital content protection (HDCP), extended display identification data (EDID) control signals, for example, and transmits these signals to image signal receiver 21 of image display device 2 via image cable 4.

Control signal communicator 14 is connected to control signal communicator 24 of image display device 2 via image cable 4. Under control of controller 10, control signal communicator 14 communicates with control signal communicator 24 of image display device 2 using, for example, HDMI-compliant hot plug detect (HPD) signals and consumer electronics control (CEC) signals.

Note that image output device 1 uses, for example, the plug and play function of HDMI to determine whether or not the connection with image display device 2 via image cable 4 is established. Specifically, when a user connects image cable 4 to image output device 1 and image display device 2, image output device 1 transmits a high-level +5V-Power signal to image display device 2, and in response, image display device 2 returns a high-level HPD signal; thus, image output device 1 can determine that the connection via image cable 4 is established.

Image output device 1 configured as described above communicates with other image output devices 1 and image display device 2 using control signals via network 5. Furthermore, image output device 1 converts the data of pairing start image signals IS stored in image signal memory 12$m$ into image data in a predetermined format and transmits the image data from image signal transmitter 13 to image display device 2 at the start of pairing, and converts the data of image signals for image display stored in image signal memory 12$m$ into image data in a predetermined format and transmits the image data from image signal transmitter 13 to image display device 2 at the time of displaying projection image.

[Configuration of Image Display Device]

Figure 3:
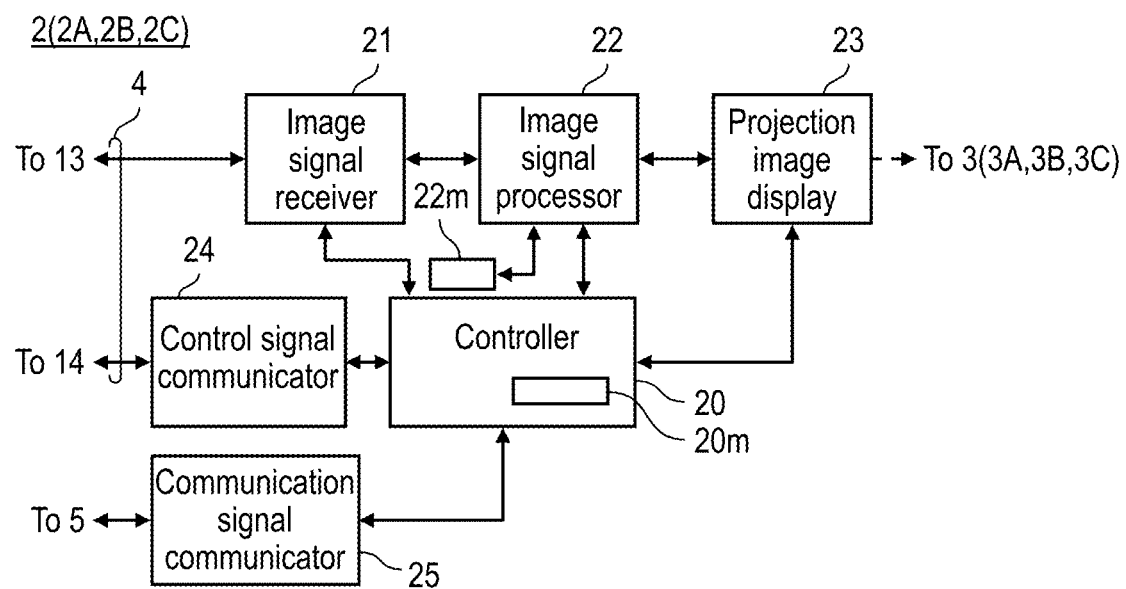
FIG. 3 is a block diagram illustrating an example of the configuration of image display devices 2A, 2B, 2C illustrated in FIG. 1.

FIG. 3 is a block diagram illustrating an example of the configuration of image display device 2 (2A, 2B, 2C) illustrated in FIG. 1. Note that image display devices 2A, 2B, 2C have substantially the same configurations.

In FIG. 3, image display device 2 includes controller 20 containing internal memory 20$m$, image signal receiver 21, image signal processor 22 containing image signal memory 22$m$, projection image display 23, control signal communicator 24, and communication signal communicator 25. Here, controller 20 controls the operation of image signal receiver 21, image signal processor 22, projection image display 23, control signal communicator 24, and communication signal communicator 25 on the basis of a program, signals, and data stored in internal memory 20$m$.

Figure 4:
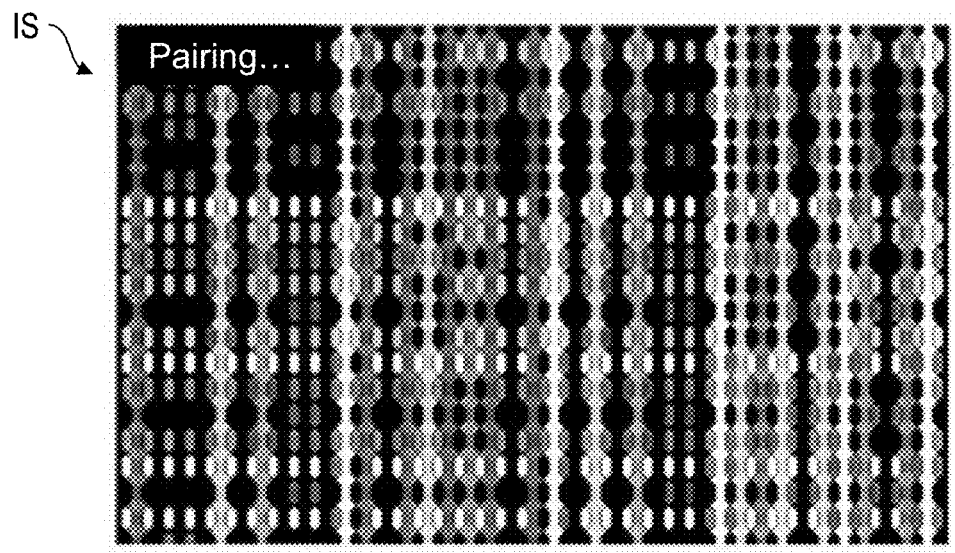
FIG. 4 is a photographic image showing a first image example of pairing start image signals IS used in the image display system illustrated in FIG. 1.

Image signal receiver 21 is connected to image signal transmitter 13 of image output device 1 via image cable 4, receives the image data via image cable 4, and outputs the image data to image signal processor 22. Image signal processor 22 determines whether the received image data is image data for image display or data of the pairing start image signals IS (FIG. 4). At this time, when the former is true, image signal processor 22 converts the image data into image signal data in a predetermined format and outputs the image signal data to projection image display 23. When the latter is true, image signal processor 22 compares the received data of the pairing start image signals IS with the data of the pairing start image signals IS stored in image signal memory 22$m$, determines, by pattern recognition, for example, whether or not these image data are the same, and outputs a determination result signal to controller 20.

Projection image display 23 converts, into predetermined projection image light, the image signal data received from image signal processor 22, and projects the predetermined projection image light onto screen 3. Control signal communicator 24 is connected to control signal communicator 14 of image output device 1 via image cable 4. Under control of controller 20, control signal communicator 24 communicates with control signal communicator 14 of image output device 1 using, for example, HDMI-compliant hot plug detect (HPD) signals and consumer electronics control (CEC) signals.

Communication signal communicator 25 transmits and receives communication signals to and from other image display devices 2 and image output device 1 via network 5 using, for example, a communication procedure according to the Transmission Control Protocol/Internet Protocol (TCP/IP), the User Datagram Protocol/Internet Protocol (UDP), or the like. Communication signal communicator 25 transmits, via broadcast or unicast, a communication signal received from controller 20 such as a message to be transmitted and receives a communication signal such as a message via network 5 and outputs the communication signal to controller 20.

Image display device 2 configured as described above communicates with image output device 1 and other image display devices 2 using control signals via network 5. Furthermore, image display device 2 determines whether the image data received from image output device 1 is image data for image display or data of the pairing start image signals IS. At this time, when the former is true, image display device 2 converts the image data into projection image light via image signal data in a predetermined format and outputs the projection image light onto screen 3. When the latter is true, image display device 2 determines, by pattern recognition, for example, whether or not the received data of the pairing start image signals IS (FIG. 4) is the same as the data of the pairing start image signals IS stored in image signal memory 22$m$, and when these image data are the same, controller 20 determines the start of pairing.

[Data of Pairing Start Image Signals]

FIG. 4 is a photographic image showing a first image example of the pairing start image signals IS used in the image display system illustrated in FIG. 1. The pairing start image signals IS in FIG. 4 are predetermined special pattern image signals, the data of which is stored in image signal memory 12$m$ of image output device 1 in FIG. 2 and image signal memory 22$m$ of image display device 2 in FIG. 3 in advance; as described above, image signal processor 22 of image display device 2 determines whether or not the received data of image signals is data of the pairing start image signals IS, and thus the start of pairing is determined.

Figure 5:
FIG. 5 is a photographic image showing a second image example of pairing start image signals IS used in the image display system illustrated in FIG. 1.

FIG. 5 is a photographic image showing a second image example of the pairing start image signals IS used in the image display system illustrated in FIG. 1.

The start of pairing may be determined according to whether or not the pairing start image signals IS shown in FIG. 5 are, for example, at a specific position (for example, in the first line) in the image signals, instead of receiving the data of the pairing start image signals IS (FIG. 4) from image output device 1 as described above. In other words, the pairing start image signals IS include a predetermined signal indicating the start of pairing at the specific position in the image signals.

[Pairing Method in Image Display System]

Figure 6:
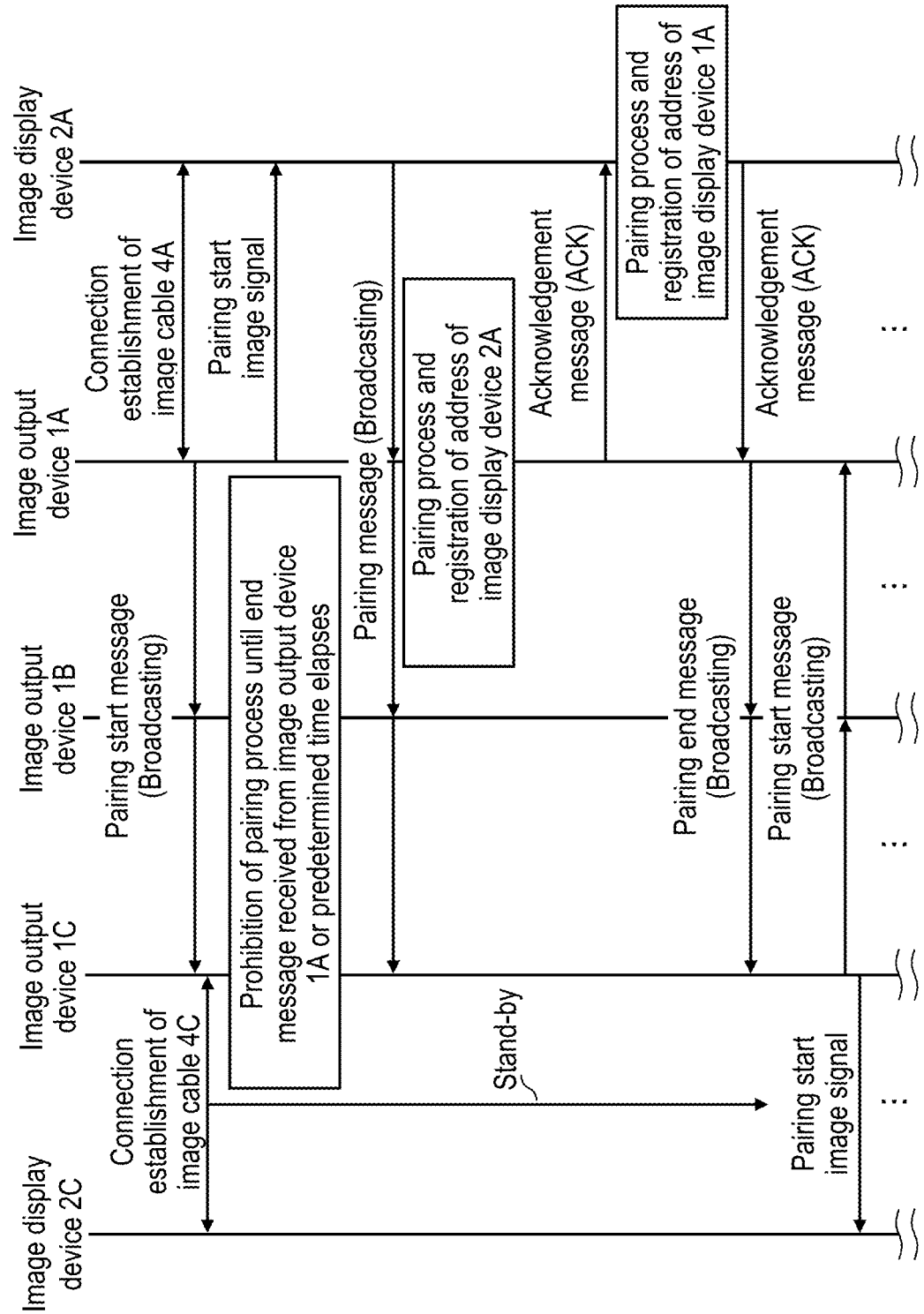
FIG. 6 is a timing chart illustrating the flow of a pairing method in the image display system illustrated in FIG. 1.

FIG. 6 is a timing chart illustrating the flow of a pairing method in the image display system illustrated in FIG. 1. In one example of the procedure illustrated in FIG. 6, first, image output device 1A and image display device 2A are connected to each other with image cable 4A, image output device 1A and image display device 2A are paired with each other, and then the process transitions to pairing between other image output devices 1B, 1C and other image display devices 2B, 2C.

In FIG. 6, first, when a user connects image output device 1A and image display device 2A to each other with image cable 4A, image output device 1 transmits a high-level +5V-Power signal to image display device 2 using, for example, the plug and play function of HDMI, and in response, image display device 2 returns a high-level HPD signal; thus, image output device 1 determines that the connection via image cable 4 is established. At this time, after image output device 1A broadcasts a pairing start message to network 5, image output device 1A transmits a pairing start image signal IS to image display device 2A connected thereto via image cable 4A.

At this time, the settings of image output devices 1B, 1C are configured so that after the pairing start message is received from image output device 1A, the process of pairing with an image output device other than image output device 1A is prohibited until a pairing end message is received from image output device 1A or predetermined time elapses. Therefore, as illustrated in FIG. 6, even when image output device 1C and image display device 2C are connected to each other with image cable 4C and it is determined that said connection is established, the process of pairing therebetween is prohibited, resulting in a stand-by status.

When image display device 2A receives the pairing start image signal IS from image output device 1A, image display device 2A broadcasts a pairing message to network 5. In response, image output device 1A performs the process of pairing with image display device 2A, registers the IP address of image display device 2A, and transmits an acknowledgement message (ACK) (one example of the first acknowledgement message) to image display device 2A which is a device to be paired with. In response, image display device 2A performs the process of pairing with image output device 1A, registers the IP address of image output device 1A, and returns an acknowledgement message (ACK) (one example of the second acknowledgement message) to image output device 1A. In response, image output device 1A broadcasts a pairing end message to network 5.

In response, image output device 1C in the stand-by status broadcasts a pairing start message to network 5 in order to start the process of pairing with image display device 2C, and then transmits a pairing start image signal IS to image display device 2C via image cable 4C. Thus, image output device 1C performs the process of pairing with image display device 2C.

[Pairing Process, etc.]

Furthermore, with reference to FIG. 7 to FIG. 11, a specific pairing process, etc., performed by image output device 1 and image display device 2 will be described below.

Figure 7:
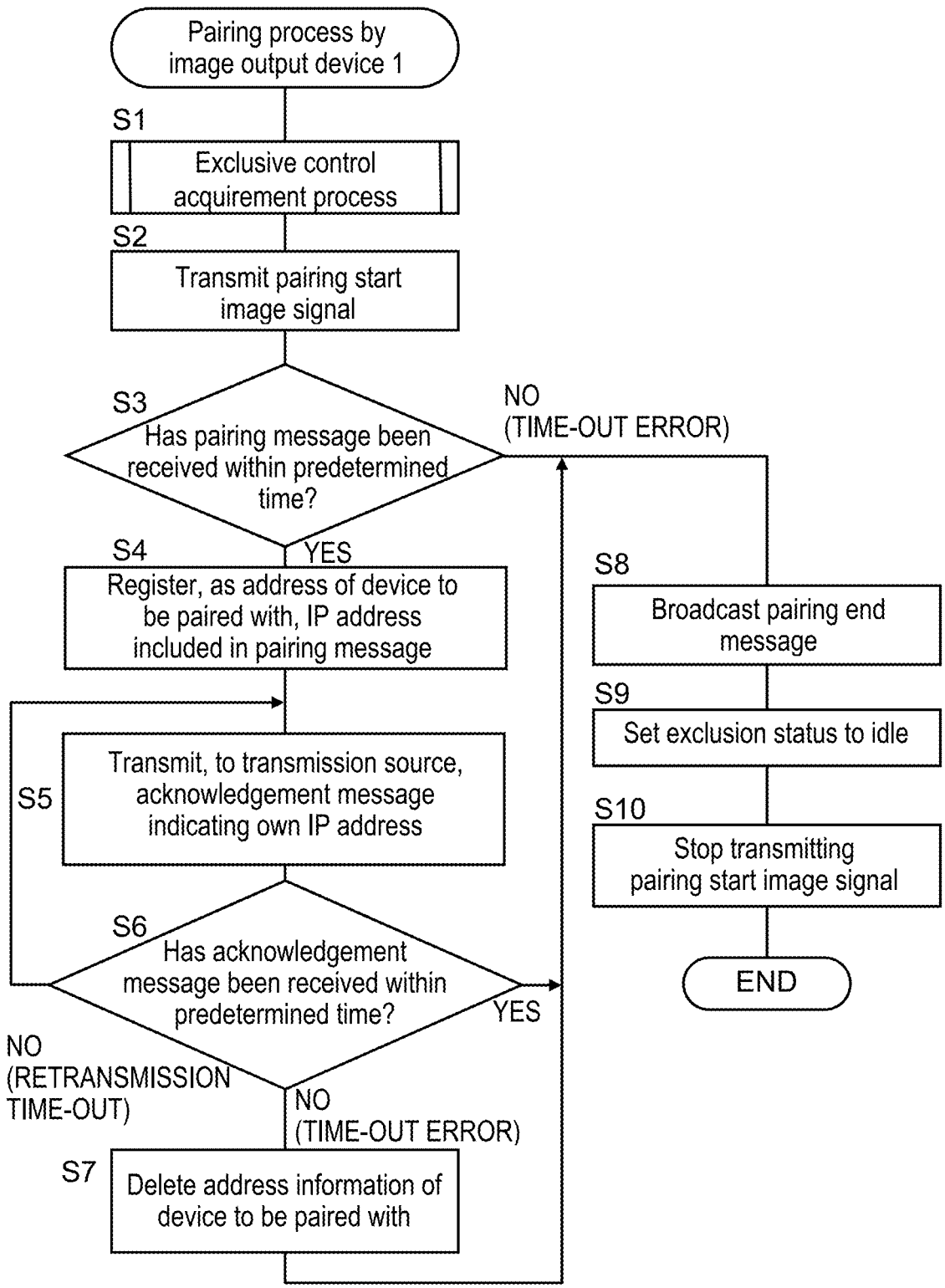
FIG. 7 is a flowchart illustrating a pairing process performed by image output device 1 illustrated in FIG. 1.

FIG. 7 is a flowchart illustrating a pairing process performed by image output device 1 illustrated in FIG. 1. Note that the timing for starting the pairing process in FIG. 7 is not limited to the above-described connection establishment of image cable 4 illustrated in FIG. 6 and may be, for example, one of the following:

(1) when a LAN cable for image output device 1 to connect to network 5 is connected;
(2) when a notification message indicating that the IP address has been changed is received from corresponding image display device 2; and
(3) when a user inputs, on an operation unit of image output device 1, an instruction to start pairing.

Image output device 1 performs an exclusive control acquisition process (FIG. 9) in Step S1 illustrated in FIG. 7 and then, in Step S2, transmits the pairing start image signal IS to image display device 2 connected thereto via image cable 4. Next, in Step S3, whether or not a pairing message has been received from connected image display device 2 within predetermined time is determined, and when the result is YES, the processing proceeds to Step S4, whereas when the result is NO, a "time-out error" is determined, and the processing proceeds to Step S8.

In Step S4, the IP address included in the received pairing message is registered in internal memory 10$m$ as the network address of a device to be paired with (connected image display device 2). Next, in Step S5, an acknowledgement message indicating the IP address of image output device 1 itself is transmitted to the device to be paired with that is a transmission source, and in Step S6, whether or not the acknowledgement message has been received within predetermined time is determined, and when the result is YES, the processing proceeds to Step S8, whereas when the result is NO for the first time and "retransmission time-out" occurs, the processing returns to Step S5, and the acknowledgement message is transmitted again, but when the result is NO for the second time and "time-out error" occurs, the processing proceeds to Step S7. In Step S7, a failure in communication via network 5 with the device to be paired with is determined, the network address of the device to be paired with is deleted, and the processing proceeds to Step S8.

In Step S8, a pairing end message is broadcast to network 5, in Step S9, the "exclusion status" is set to "idle", and in Step S10, the transmission of the pairing start image signal IS is stopped, ending this pairing process.

Figure 8:
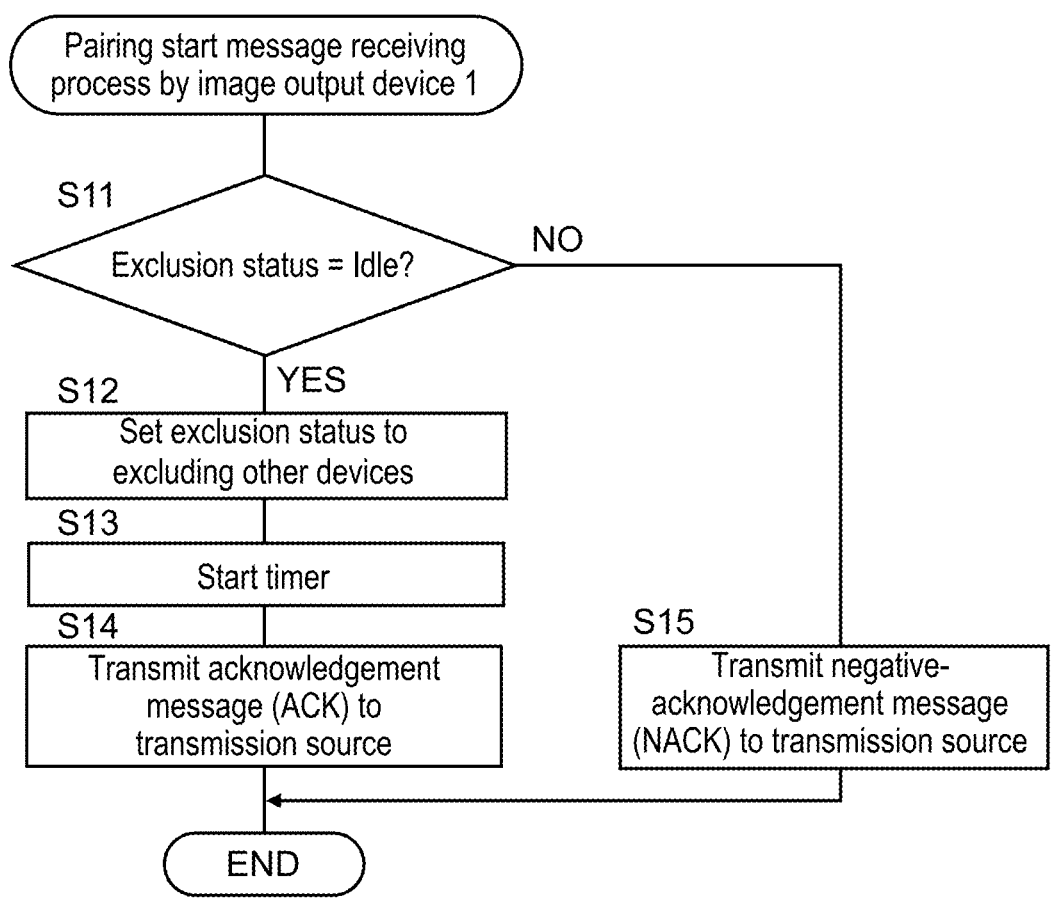
FIG. 8 is a flowchart illustrating a pairing start message receiving process performed by image output device 1 illustrated in FIG. 1.

FIG. 8 is a flowchart illustrating a pairing start message receiving process performed by image output device 1 illustrated in FIG. 1. The pairing start message receiving process illustrated in FIG. 8 starts when a pairing start message is received.

In FIG. 8, in Step S11, whether or not the "exclusion status" is "idle" is determined, and when the result is YES, the processing proceeds to Step S12, whereas when the result is NO, the processing proceeds to Step S15. Next, in Step S12, the "exclusion status" is set to "excluding other devices", in Step S13, a timer is started to count up predetermined time, and in Step S14, an acknowledgement message (ACK) is transmitted to the transmission source of the pairing start message, ending this pairing start message receiving process. On the other hand, in Step S15, a negative-acknowledgement message (NACK) is transmitted to the transmission source of the pairing start message, ending this pairing start message receiving process.

Note that after the timer is started in Step S13 in FIG. 8, when the timer counts up the predetermined time, a timer end signal is generated.

Figure 9:
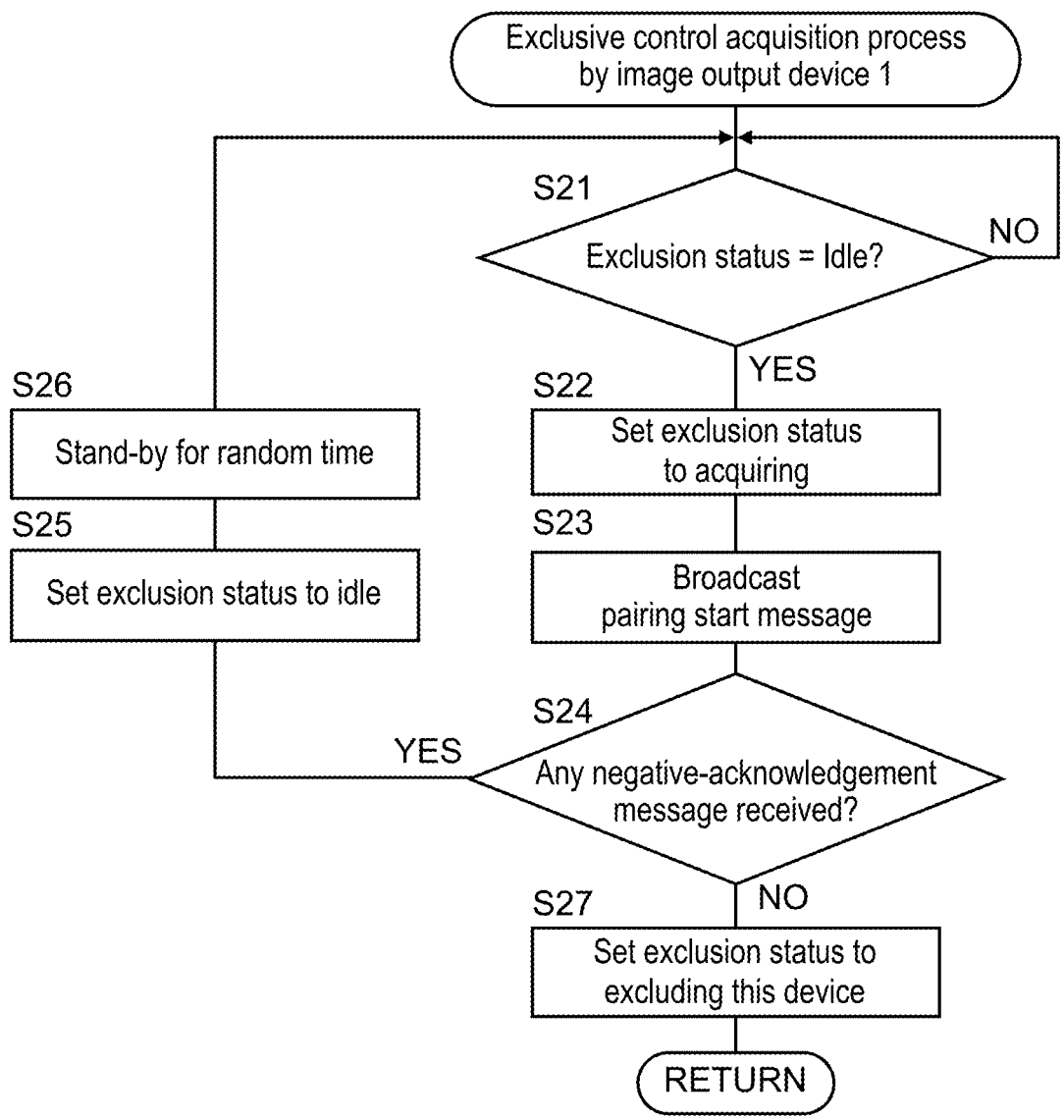
FIG. 9 is a flowchart illustrating an exclusive control acquisition process performed by image output device 1 illustrated in FIG. 1.

FIG. 9 is a flowchart illustrating an exclusive control acquisition process performed by image output device 1 illustrated in FIG. 1. The exclusive control acquisition process illustrated in FIG. 9 is a subroutine that is performed in Step S1 in FIG. 7.

In FIG. 9, in Step S21, whether or not the "exclusion status" is "idle" is determined, and when the result is YES, the processing proceeds to Step S22, whereas when the result is NO, the processing returns to Step S21. In Step S22, the "exclusion status" is set to "acquiring", in Step S23, a pairing start message is broadcast to network 5, and the processing proceeds to Step S24. In Step S24, whether or not a negative-acknowledgement message (NACK) has been received via network 5 is determined, and when the result is YES, the processing proceeds to Step S25, whereas when the result is NO, the processing proceeds to Step S27. In Step S25, the "exclusion status" is set to "idle", and after a stand-by period lasting for predetermined random time in Step 26, the processing returns to Step S21. On the other hand, in Step S27, the "exclusion status" is set to "excluding this device", and this exclusive control acquisition process is ended; then, the processing returns to Step S2 in FIG. 7.

Figure 10:
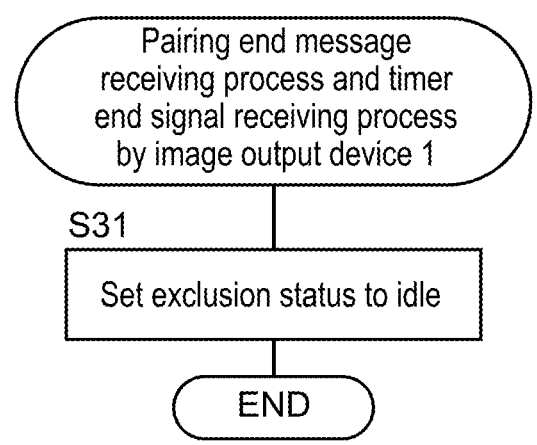
FIG. 10 is a flowchart illustrating a pairing end message receiving process and a timer end signal receiving process performed by image output device 1 illustrated in FIG. 1.

FIG. 10 is a flowchart illustrating a pairing end message receiving process and a timer end signal receiving process performed by image output device 1 illustrated in FIG. 1. The pairing end message receiving process and the timer end signal receiving process illustrated in FIG. 10 start when a pairing end message is received or when a timer end signal is received.

In Step S31 in FIG. 10, the "exclusion status" is set to "idle", and this process is ended.

FIG. 11 is a flowchart illustrating a pairing process performed by image display device 2 illustrated in FIG. 1. The pairing process illustrated in FIG. 11 starts when an image signal is received from connected image output device 1.

In FIG. 11, in Step S41, whether or not the received image signal is the pairing start image signal IS is determined, and when the result is YES, the processing proceeds to Step S42, whereas when the result is NO, the processing returns to Step S41. In Step S42, a pairing message indicating an IP address is broadcast, in Step S43, whether or not an acknowledgement message has been received within predetermined time is determined, and when the result is YES, the processing proceeds to Step S44, whereas when the result is NO, the processing returns to Step 41 as a result of determining "time-out". Furthermore, in Step S44, the IP address included in the received acknowledgement message is registered in internal memory 20m as the network address of the device to be paired with (connected image output device 1), an acknowledgement message is transmitted to the device to be paired with (connected image output device 1) that is a transmission source, and the processing returns to Step S41.

Advantageous Effects of Exemplary Embodiment

In the conventional example, in order to link, on network 5, image output device 1 and image display device 2 which receives the image signal output from image output device 1, network addresses need to be explicitly designated, resulting in a problem of increased complexity of address settings in an image display system including more than one pair of image output device 1 and image display device 2.

In order to solve this problem, as described above, according to the present exemplary embodiment, when image cable 4 is connected between image output device 1 and image display device 2 and it is determined that the connection has been established, image output device 1 transmits a predetermined pairing start image signal IS to image display device 2. In response, when image display device 2 receives the pairing start image signal IS, image display device 2 transmits a broadcast packet onto network 5, and image output device 1 receives the packet and thus can obtain the network address of connected image display device 2.

Thus, the network addresses are obtained and registered automatically between image output device 1 and image display device 2 by just connecting image cable 4 between image output device 1 and image display device 2; therefore, the unique effect of improving the reliability and convenience of device-to-device communication is produced.

[Variations]

The above exemplary embodiment describes only transmission of the image signals, but the present disclosure is not limited to the above exemplary embodiment; in addition to the image signals, sound signals (audio signals) may be transmitted together. Specifically, the image cable may be an image/audio cable such as a high-definition multimedia interface (HDMI) cable and an audio video interleave (AVI) cable.

In the above image display system, each image output device 1 stores image data, but the present disclosure is not limited to the above exemplary embodiment; an image data server device that is connected to network 5 may be pe provided, and the image data may be supplied from the image data server device to each image output device 1.

The exemplary embodiment has been described above by way of example of the techniques in the present disclosure. To this extent, the accompanying drawings and the detailed description are provided.

Thus, the structural elements described in the accompanying drawings and the detailed description may include not only structural elements indispensable to solve the problem, but also structural elements not necessarily indispensable to solve the problem in order to provide examples of the techniques. Thus, those structural elements not necessarily indispensable should not be deemed essential due to the mere fact of their being described in the accompanying drawings and the detailed description.

Furthermore, since the above-described exemplary embodiment is for exemplifying the techniques in the present disclosure, various modifications, substitutions, additions, and omissions can be carried out within the scope of the claims and their equivalents.

As described in detail above, according to the present disclosure, network addresses can be obtained and registered automatically between an image output device and an image display device by just connecting an image cable between the image output device and the image display device.

What is claimed is:

1. An image output device for use in an image display system including a plurality of image output devices and a plurality of image display devices, the plurality of image output devices and the plurality of image display devices being connected to each other via a network, the image output device being one of the plurality of image output devices and comprising:
   a controller configured to, when the image output device and a predetermined image display device that is one of the plurality of image display devices are connected, transmit a first image signal to the predetermined image display device, wherein
   when the image output device and the predetermined image display device are connected, the controller broadcasts a first message to the network and disables the predetermined image display device to pair with a different image output device other than the image output device, and
   after the controller broadcasts the first message to the network, the controller receives a pairing message including a network address of the predetermined image display device from the predetermined image display device.

2. The image output device according to claim 1, wherein the first image signal is a predetermined pattern image signal or an image signal including, at a specific position in the image signal, a signal indicating a start of pairing.

3. The image output device according to claim 1, wherein the controller obtains and registers the network address of the predetermined image display device and transmits a second message including a network address of the image output device to the predetermined image display device.

4. The image output device according to claim 3, wherein after the controller transmits the second message to the predetermined image display device, the controller receives a third message from the predetermined image display device, and the controller broadcasts a pairing end message to the network.

5. An image display system, comprising:
the image output device according to claim 1; and
an image display device that is one of the plurality of image display devices and comprising:
a controller configured to, when a predetermined image output device that is one of the plurality of image output devices and the image display device are connected, receive the first image signal transmitted from the predetermined image output device.

6. An image display device for use in an image display system including a plurality of image output devices and a plurality of image display devices, the plurality of image output devices and the plurality of image display devices being connected to each other via a network, the image display device being one of the plurality of image display devices and comprising:
a controller configured to, when a predetermined image output device that is one of the plurality of image output devices and the image display device are connected, receive a first image signal transmitted from the predetermined image output device, wherein
after the controller receives the first image signal transmitted from the predetermined image output device, the controller broadcasts a pairing message including a network address of the image display device to the network, and
after the controller broadcasts the pairing message, the controller receives a second message including a network address of the predetermined image output device from the predetermined image output device.

7. The image display device according to claim 6, wherein the controller obtains and registers the network address of the predetermined image output device and transmits a third message to the predetermined image output device.

8. A pairing method for use in an image display system including a plurality of image output devices and a plurality of image display devices, the plurality of image output devices and the plurality of image display devices being connected to each other via a network, the pairing method comprising:
transmitting a first image signal from a predetermined image output device to a predetermined image display device when the predetermined image output device and the predetermined image display device are connected, the predetermined image output device being one of the plurality of image output devices, the predetermined image display device being one of the plurality of image display devices; and
receiving, by the predetermined image display device, the first image signal transmitted from the predetermined image output device;
broadcasting a first message from the predetermined image output device to the network and disabling, by the predetermined image output device, the predetermined video display device to pair with a different image output device other than the predetermined image output device among the plurality of image output devices when the predetermined image output device and the predetermined image display device are connected; and
broadcasting a pairing message including a network address of the predetermined image display device from the predetermined image display device to the network after the predetermined image display device receives the first image signal transmitted from the predetermined image output device.

9. The pairing method for use in the image display system according to claim 8, wherein
the first image signal is a predetermined pattern image signal or an image signal including, at a specific position in the image signal, a signal indicating a start of pairing.

10. The pairing method for use in the image display system according to claim 8, further comprising:
receiving the pairing message including the network address of the predetermined image display device by the predetermined image output device from the predetermined image display device; and
obtaining and registering the network address of the predetermined image display device by the predetermined image output device, and transmitting a second message including a network address of the predetermined image output device from the predetermined image output device to the predetermined image display device.

11. The pairing method for use in the image display system according to claim 10, further comprising:
receiving a third message by the predetermined image output device from the predetermined image display device after the predetermined image output device transmits the second message to the predetermined image display device; and
broadcasting a pairing end message from the predetermined image output device to the network.

* * * * *